United States Patent
Ratnakar

(10) Patent No.: US 7,593,721 B2
(45) Date of Patent: Sep. 22, 2009

(54) METHOD AND APPARATUS FOR DELIVERING GEOGRAPHICAL SPECIFIC ADVERTISEMENTS TO A COMMUNICATION DEVICE

(76) Inventor: Nitesh Ratnakar, 8600 S. Liberty La., #2410, Oak Creek, WI (US) 53154

( * ) Notice: Subject to any disclaimer, the term of this patent is extended or adjusted under 35 U.S.C. 154(b) by 162 days.

(21) Appl. No.: 11/308,900

(22) Filed: May 24, 2006

(65) Prior Publication Data

US 2007/0111712 A1    May 17, 2007

Related U.S. Application Data

(63) Continuation-in-part of application No. 11/164,318, filed on Nov. 17, 2005.

(51) Int. Cl.
*H04M 3/493* (2006.01)
*H04M 3/42* (2006.01)
*H04W 24/00* (2006.01)
*G01C 21/30* (2006.01)
*G01C 21/32* (2006.01)
*G06Q 30/00* (2006.01)
*G07G 1/14* (2006.01)

(52) U.S. Cl. ............. 455/414.2; 455/256.1; 701/208; 705/14

(58) Field of Classification Search ............. 455/414.2, 455/456.1; 701/208; 705/14
See application file for complete search history.

(56) References Cited

U.S. PATENT DOCUMENTS

| | | | | |
|---|---|---|---|---|
| 5,930,699 A | | 7/1999 | Bhatia | 455/456.3 |
| 5,938,721 A | * | 8/1999 | Dussell et al. | 701/211 |
| 6,133,853 A | | 10/2000 | Obradovich | |
| 6,148,261 A | | 11/2000 | Obradovich | |
| 6,400,806 B1 | * | 6/2002 | Uppaluru | 379/88.02 |
| 6,400,941 B1 | * | 6/2002 | Nara | 455/422.1 |
| 6,434,381 B1 | | 8/2002 | Moore et al. | 455/414.3 |
| 6,515,595 B1 | | 2/2003 | Obradovich | |
| 6,525,768 B2 | | 2/2003 | Obradovich | |
| 6,529,824 B1 | | 3/2003 | Obradovich | |
| 6,546,002 B1 | | 4/2003 | Kim | |
| 6,587,835 B1 | | 7/2003 | Treyz | |
| 6,629,136 B1 | | 9/2003 | Naidoo | 709/219 |
| 6,707,421 B1 | | 3/2004 | Drury | |
| 6,771,290 B1 | | 8/2004 | Hoyle | |
| 6,812,888 B2 | | 11/2004 | Drury | |
| 6,868,335 B2 | | 3/2005 | Obradovich | |
| 6,898,434 B2 | | 5/2005 | Pradhan | |

(Continued)

OTHER PUBLICATIONS

U.S. Appl. No. 09/931,896, filed Mar. 21, 2002, Lessard.

(Continued)

*Primary Examiner*—Vincent P Harper
*Assistant Examiner*—Ariel Balaoing

(57) ABSTRACT

The present invention relates to apparatus, method and system for advertising on communication devices, such as cellular phones. A 'central contact information database' containing contact information of businesses and individuals is created. The 'central contact information database' is saved in a 'central server'. One or more advertisements in the form of data, audio, video, or image file or a combination thereof is paired to one or more contact information contained in the 'central contact information database'. The contact information and paired advertisements may then be downloaded and automatically stored in memory of a communication device. In one embodiment, the contact information is downloaded based on a geographical location of the communication device.

4 Claims, 10 Drawing Sheets

U.S. PATENT DOCUMENTS

| | | |
|---|---|---|
| 6,924,748 B2 | 8/2005 | Obradovich |
| 6,965,868 B1 | 11/2005 | Bednarek |
| 7,113,110 B2 | 9/2006 | Horstemeyer |
| 7,116,985 B2 | 10/2006 | Wilson |
| 7,127,261 B2 | 10/2006 | Van Erlach |
| 7,133,834 B1 | 11/2006 | Abelow |
| 7,167,553 B2 | 1/2007 | Shaffer |
| 7,170,852 B1 | 1/2007 | Adler |
| 7,174,301 B2 | 2/2007 | Florance |
| 7,181,227 B2 | 2/2007 | Wilson |
| 2002/0052196 A1* | 5/2002 | Padawer et al. .............. 455/414 |
| 2002/0184089 A1* | 12/2002 | Tsou et al. .................... 705/14 |
| 2003/0014754 A1* | 1/2003 | Chang ......................... 725/60 |
| 2004/0110515 A1* | 6/2004 | Blumberg et al. ......... 455/456.1 |
| 2004/0116115 A1* | 6/2004 | Ertel ........................ 455/426.2 |
| 2004/0250212 A1* | 12/2004 | Fish ........................... 715/752 |
| 2005/0001743 A1 | 1/2005 | Haemerle ................... 340/988 |
| 2006/0046768 A1* | 3/2006 | Kirbas ...................... 455/550.1 |

OTHER PUBLICATIONS

U.S. Appl. No. 09/841,268, filed Jan. 31, 2002, Janik.

* cited by examiner

|  | ENTITY N | ENTITY N+1 |
|---|---|---|
| NAME | | |
| PHONE | | |
| FAX | | |
| STREET | | |
| CITY | | |
| STATE | | |
| ZIP | | |
| EMAIL | | |
| WEB SITE | | |
| OTHER INFORMATION | | |
| ADVERTISEMENT N | | |
| ADVERTISEMENT N+1 | | |
| | | |

FIG. 1

CONTACT LSIT OF COMMUNICATION DEVICE 1

| | NAME | PH. | FAX | STREET | CITY | STATE | ZIP | EMAIL | WEB SITE | OTHER | ADVERTISEMENT |
|---|---|---|---|---|---|---|---|---|---|---|---|
| ENTITY N | | | | | | | | | | | |
| ENTITY +1 | | | | | | | | | | | |
| | | | | | | | | | | | |
| | | | | | | | | | | | |
| | | | | | | | | | | | |
| | | | | | | | | | | | |

| | NAME | PH. | FAX | STREET | CITY | STATE | ZIP | EMAIL | WEB SITE | OTHER | ADVERTISEMENT |
|---|---|---|---|---|---|---|---|---|---|---|---|
| ENTITY N | | | | | | | | | | | |
| ENTITY +1 | | | | | | | | | | | |
| | | | | | | | | | | | |
| | | | | | | | | | | | |
| | | | | | | | | | | | |
| | | | | | | | | | | | |

CONTACT LIST OF COMMUNICATION DEVICE 2

METHOD AND APPARATUS FOR DELIVERING GEOGRAPHICAL SPECIFIC ADVERTISEMENTS TO A COMMUNICATION DEVICE

CROSS-REFERENCE RO RELATED APPLICATION

The present application is a continuation-in-part of U.S. Ser. No. 11/164,318, filed Nov. 17, 2005, the disclosure of which is incorporated herein.

FIELD OF INVENTION

The present invention relates to an apparatus, method and system for advertising on communication devices such as cellular phones, and more specifically, to an apparatus, method and system for advertising on communication devices in conjunction with contact information of businesses and individuals saved in the contact list of said devices.

BACKGROUND & PRIOR ART

Contact list is a common feature in most communication devices; including cellular phones and landline phones. It is a convenient feature that enables callers to save contact information of businesses and individuals in the communication device, so callers do not have to memorize all contact information. Generally, a caller has to manually enter phone number and other contact information of businesses and individuals into the contact list of communication devices such as cellular phones, landline phones, etc. When the caller wishes to call a business or individual whose contact information has been saved in the contact list of communication device, he or she is required to select the phone number of the said business or individual from the contact list of said communication device and then select the auto dial feature of communication device to automatically dial the selected phone number. This has the advantage of not requiring the caller to remember phone numbers and other contact information of businesses and individuals; which would otherwise be challenging and impractical. The automatic dial feature of communication device enables callers dial phone number from the contact list of communication devices without having to manually dial said number. Particularly, this feature allows driver to safely make a phone call while driving, as it enables them to automatically make a phone call from the contact list of communication device without having to divert attention away from driving to manually dial a phone number.

However, present communication devices have significant limitations with respect to the features, functionality and management of their contact list; namely. these devices 1) requires manual entry of contact information into the contact list; 2) allows retrieval of contact information of only those businesses and individuals whose contact information have been saved in the contact list. When the caller has to call a business or individual not listed in the contact list of communication device, he or she has to look up contact information of said business individual at external resources such as the 'yellow book', directory assistance, Internet, etc. Once said contact information is found, it has to be manually entered and saved into the contact list of communication device. This a cumbersome and time consuming process, especially when the caller desires to save contact information of multiple businesses and individuals into the contact list of the communication device. Also, it is not possible to search for contact information from external sources such as 'yellow book', Internet etc. at all times, simply because the resources needed to do so are not readily available at all times; for example while driving. Some modern communication devices, especially cellular phones, are web enabled and enable callers to access the Internet. This enables callers to find contact information of businesses and individuals by accessing resources available on the Internet. An example of such resource is www.yellowpages.com, which enables callers to find contact information of businesses. However, this system too has limitations and drawbacks; namely it 1) requires manual entry of desired business's or individual's information, such as name, location etc into the web browser; 2) does not enable callers to automatically save contact information obtained upon search into the contact list of communication devices; 3) does not enable callers to automatically dial phone number displayed in the search result; 4) requires new search for each business or individual, making it tedious and impractical for callers who need to find contact information of multiple businesses or individuals; 5) requires access to the internet every time contact information search is to be performed; and 6) requires subscription to wireless Internet service, which is usually quite expensive.

It is a known fact that most contact information search is done to find a phone number and other contact information of local businesses and individuals. It is also a known fact that individuals do a majority of commerce with local businesses and individuals, usually within a fifty-mile radius of their residence or place of work. However, there is no method, system or apparatus apparent in the prior art that would enable callers to download and save contact information of local businesses and individuals into the contact list of communication devices, without requiring them to manually enter contact information of each local business and individual. At present, saving contact information of local businesses and individuals into the contact list of communication devices is a cumbersome and time consuming process, and is unfeasible if caller wishes to save contact information of large number of local businesses and individuals. U.S. patent application Ser. No. 11/164,318 filed on Nov. 17, 2005 an apparatus, method, and system to enable callers download and save contact information of large number of businesses and individuals into the contact list of communication devices without needing to manually enter each contact information and without needing to search for contact information of each business or individual individually is disclosed. There-after, callers can find contact information of large number of businesses and individuals from within the contact list of communication devices without requiring access to an outside contact information resource.

Presently, communication devices such as cellular phones are not used to their fullest potential for the purpose of advertising products and services of businesses and individuals. With the ability to access the Internet on modem communication devices, advertising is gradually picking up the pace in the realm of communication devices. Most advertising presently done on communication devices is done in a web based environment. An example of such method is the 'wireless Google' at www.google.com where advertisements are displayed wit search results generated in response to a caller's query. In this method, the caller is required to subscribe to the wireless Internet service, start internet browser on the communication device, access www.google.com and thereafter perform a search on www.google.com. Advertisements are displayed along with results of said search. As is evident, this method requires access to wireless Internet service, which is usually expensive and not available at all locations at all times. More importantly, callers are exposed to advertisements only at a time when they are accessing said web site, which comprises of only a small fraction of their airtime usage. Callers us majority of their airtime on communication devices making phone calls to other callers. In addition, such method of advertising is general in nature and does not enable businesses to micro target their advertisements, in ways that is made possible with the present invention. There is no apparent invention in the prior art which enables businesses and individuals to advertise in conjunction with phone calls made from communication devices such as cellular phones. Consequently, there still remains a need for an apparatus, system and method to enable businesses and individuals to advertise on communication devices, such as cellular phones, in conjunction with phone calls made from these devices.

SUMMARY OF THE INVENTION

Accordingly, the present invention provides an apparatus, system, and method to enable businesses and individuals to advertise on communication devices, such as cellular phones, in conjunction with phone calls made from these devices. More specifically, the present invention provides an apparatus, system, and method to enable businesses and individuals to advertise on communication devices in conjunction with contact information saved in the contact list of said communication devices.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention.

The present invention relates to an apparatus, method, and system for advertising on communication devices such as cellular phones. A 'central contact information database' containing contact information of businesses and individuals is created. The 'central contact information database' is saved in a 'central server'. One or more advertisements in the form of data, audio, video, or image file or a combination thereof is paired to on or more contact information contained in the 'central contact information database'. An advertisement is paired with contact information by means of attachment to corresponding contact information or by means of a link to corresponding contact information. According to one aspect, means is provided for callers to download contact information and corresponding advertisements from the 'central contact information database' into the contact list of communication device. Advertisement is displayed on communication device when corresponding contact information is displayed or when corresponding contact information is retrieved from the contact list of communication device. U.S. patent application Ser. No. 11/164,318 filed on Nov. 17, 2005, the disclosure of which incorporated herein, enables callers to download and save contact information of a large number of local businesses and individuals into the contact list of communication device without having to manually enter each contact information, which can be cumbersome and unfeasible especially when the contact information data is large. The present invention provides a means for businesses and individuals to advertise in conjunction with contact information saved in contact list of communication devices such as cellular phones.

BRIEF DESCRIPTION OF THE DRAWINGS

FIG. 1 shows the structure of the 'central contact information database' with means to save advertisements paired with contact information saved therein.

DETAILED DESCRIPTION OF THE INVENTION

Figure 2:
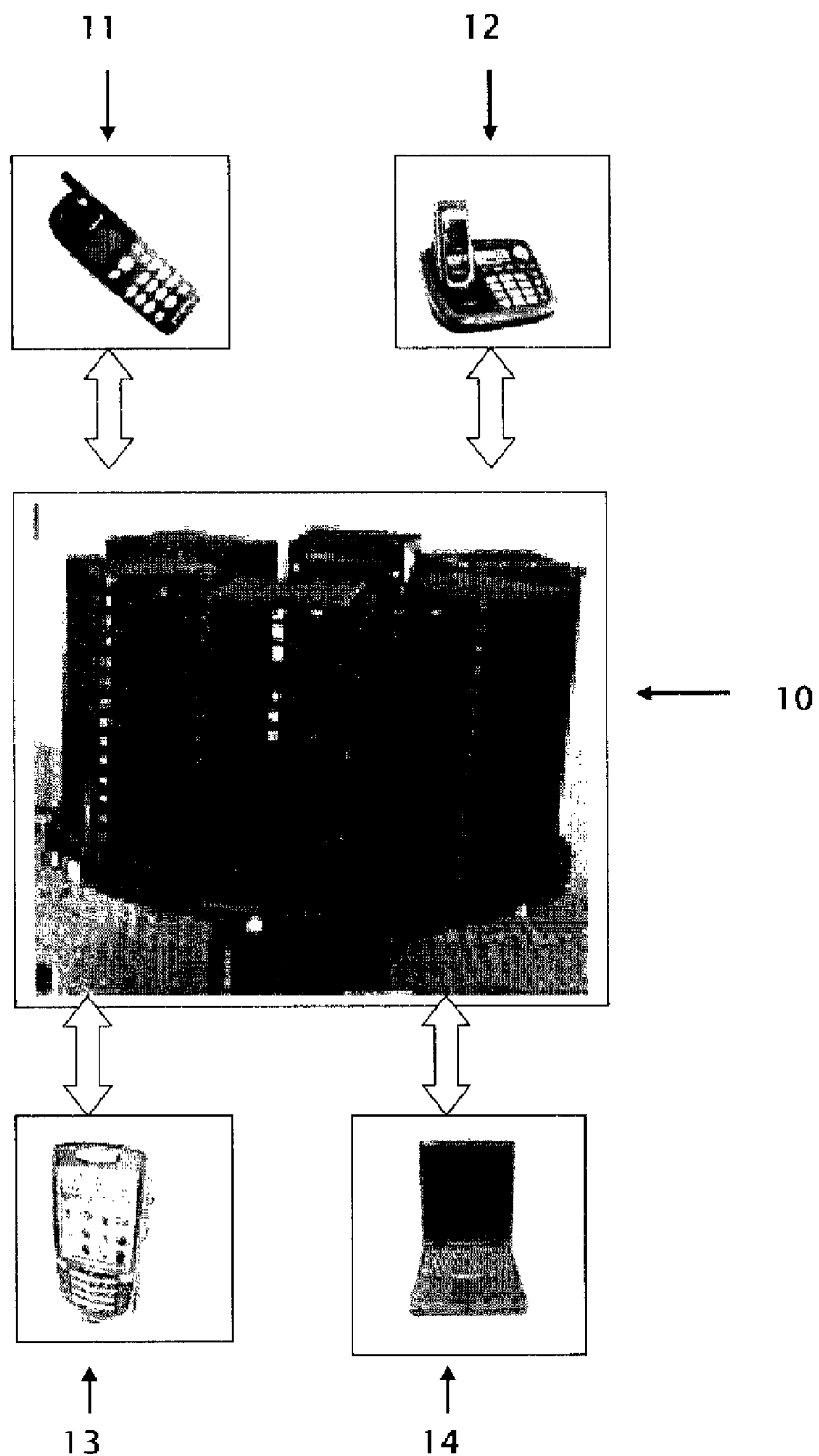
FIG. 2 shows the 'central server' containing the 'central contact information database' and an overview of the process of transfer of contact information and advertisements between the 'central server' and communication devices.

According to one aspect of the invention, a 'central contact information database' containing contact information of businesses and individuals is created. The structure of the 'central contact information database' is shown in FIG. 1. Contact information contained in the 'central contact information database' comprises of business individual's name, phone number, fax number, street address, city, state, postal code, email, web URL and any additional information like business hours, driving direction or any other pertinent information. The 'central contact information database' can be created using one or many available database programs like My SQL, MSSQL, MS Access and the like. The 'central contact information database' is saved in a remote device; e.g. 'central server' (10) as shown in FIG. 2. According to one method, contact information is entered into the 'central contact information database' in a web-based environment. Web portal is provided for businesses and individuals to enter contact information into the 'central contact information database'. According to another method, contact information of businesses and individuals is imported into the 'central contact information database' from an existing contact information database. One example of such a source is the 'Yellow Pages', which is published both in print form and online at www.yellowpages.com. Means is provided in the 'central contact information database' to sort contact information contained therein, according to multiple variables such as city, postal code, location, state, type or category of business, name of business or individual, hours of operation etc.

Figure 3:
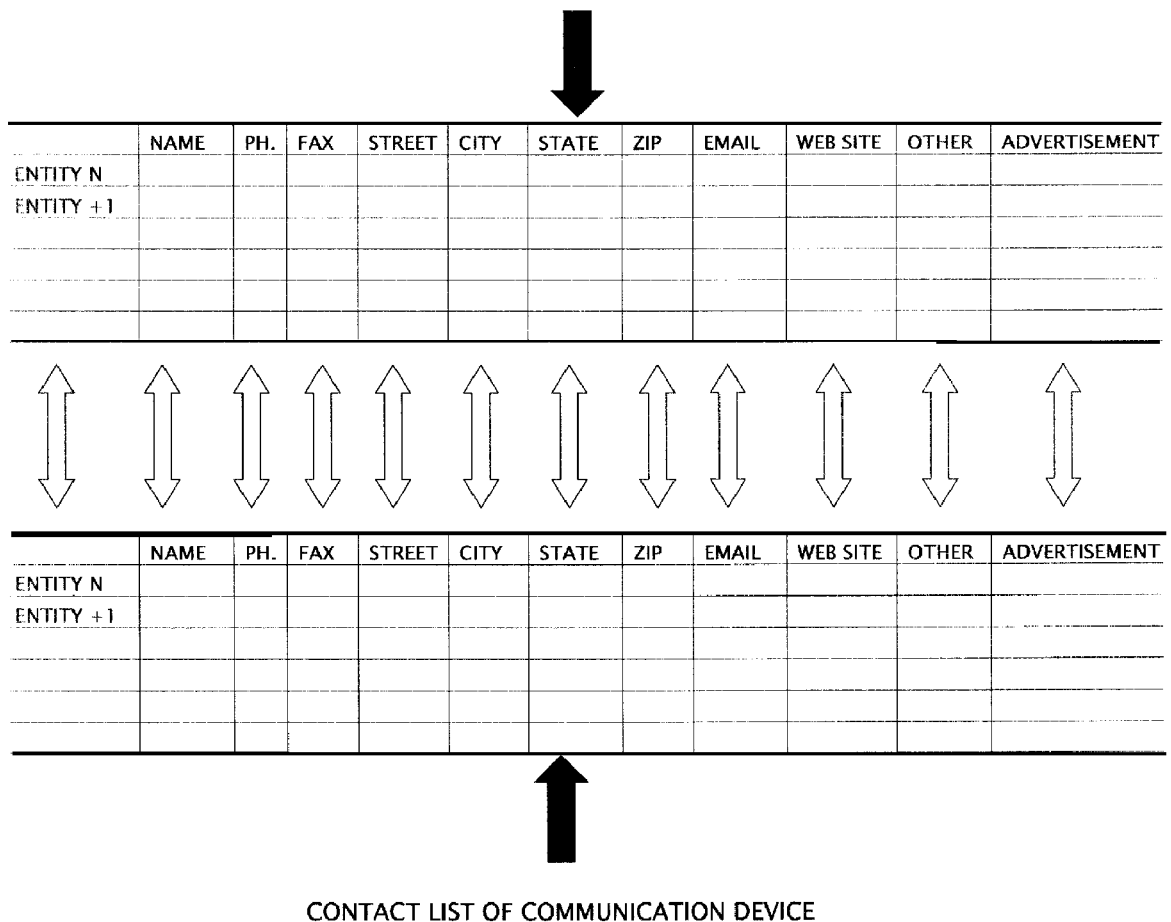
FIG. 3 illustrates the similarity of data fields in the 'central contact information' database and the contact list database of communication devices. It also illustrates the method of transfer of data contained in corresponding data fields of the 'central contact information' database and the contact list of communication devices.

According to another aspect of the invention, means is provided for callers to download and save contact information of businesses and individuals from the 'central contact information database' into the contact list of communication devices such as cellular phones (11), landline phones (12), personal computers (14), PDA (13) etc as shown in FIG. 2. The database structure of the contact list of communication devices is similar to that of the 'central contact information database as shown in FIG. 3. Data fields contained in the contact list of communication device are similar to data fields contained in the 'central contact information database'. Data from one field of the 'central contact information database' is transferred and saved into corresponding data field of the contact list of communication devices. Thereafter contact information can be searched and accessed from within the contact list of communication devices without the need to re-access the 'central contact information database'. Means is provided to enable callers to download contact information of a group of businesses or group of individuals from the 'central contact information database' into the contact list of communication device. For example, contact information data of 1) all local businesses within a certain mile radius of a zip code; 2) all local businesses in a particular business category; and/or 3) selected local businesses, etc can be downloaded. This feature enables callers to save contact information of a group of businesses or individuals into the contact list of a communication device without needing to manually enter each contact information individually. Once downloaded and saved in the contact list of communication device, contact information data is searchable by business name, business category or other sub-category from within the communication device. Accordingly, when a caller has to call a business or individual, he or she searches for said business's or individual's contact information in the contact list of communication device and thereafter dials phone number contained therein without needing to search for said contact information elsewhere. Preferably an auto dial feature is provided in the communication devices. According to another aspect, when a caller travels to a different location, he or she is provided means to download contact information of local businesses and individuals in the caller's new location. Caller is required to enter his or her new location into the system and there-after download contact information of local businesses and individuals into the contact list of communication device. For example, when caller travels from Chicago, Ill. to New York, N.Y., he or she can download contact information of local businesses in New York, N.Y. (example all coffee shops in New York, N.Y.; or all local businesses in Zip code 07024 and the like) into caller's communication device. According to yet another method, contact information of local businesses and individuals in caller's location is automatically downloaded into caller's communication device based on automatic determination of the location of said communication device. The location of communication device can be automatically determined by the system using one of many available methods, like Global Positioning System (GPS), originating cellular tower location, location of landline phone, internet protocol (IP) address and the like. This provides callers means to automatically download contact information of local businesses and individuals into communication device, without requiring callers to enter their location into the system. This feature is particularly useful for callers who travel frequently. For example, a caller driving from Chicago, Illinois to New York, New York wants to go to the nearest Wal-Mart store while driving through Cleveland, Ohio. Contact information of local businesses in Cleveland, Ohio is automatically downloaded into the caller's communication device, such as cellular phone, when caller enters Cleveland, Ohio. When the caller searches for 'Wal-Mart' in the contact list of his or her communication device, such as cellular phone, while in Cleveland, Ohio contact information of Wal-Mart stores in Cleveland, Ohio is displayed.

Figure 4:
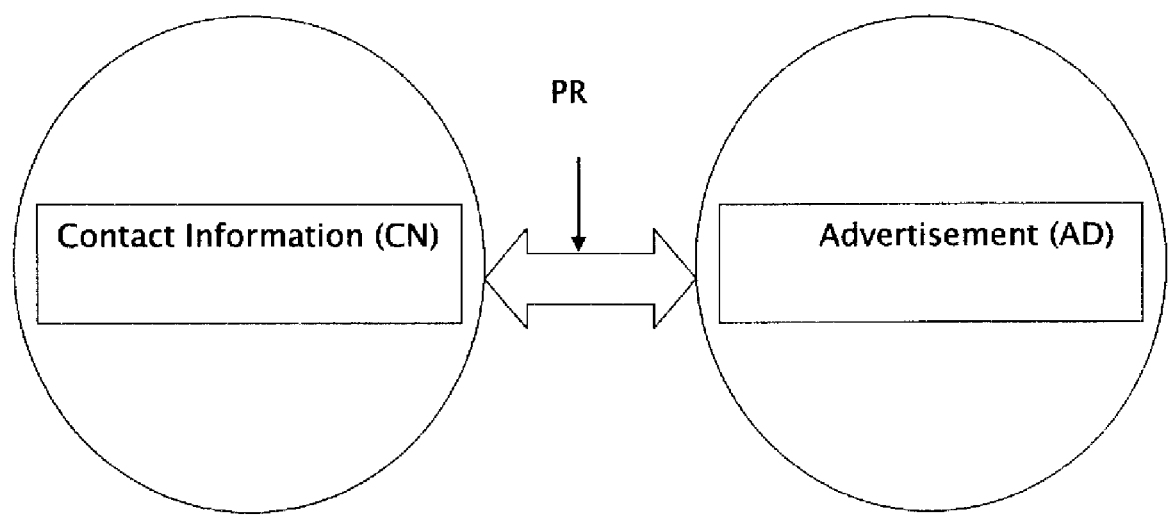
FIG. 4 shows the method of pairing of advertisement with corresponding contact information in the 'central contact information' database.

According to another aspect of the invention, advertisements, in the form of audio, video, image, data or a combination thereof, are saved in the 'central contact information database' as shown in FIG. 1 Means is provided in the 'central server' (10) to pair (PR) advertisements (AD) with corresponding contact information (CN), as shown in FIG. 4. Advertisements are saved with corresponding contact information in the 'central contact information' database, as shown in FIG. 1. Means is provided to pair multiple advertisements to a given contact information. Additionally, means is provided to pair an advertisement to multiple contact information. According to one method, a web portal is provided to enable businesses and individuals to find suitable contact information of businesses and individuals with which to pair advertisements. The said web portal lists contact information of businesses and individuals listed in the 'central contact information database'. Means is provided in the web portal to generate and display 'relevance profile', 'download statistics' and 'usage statistics' of contact information listed thereon. 'Relevance Profile' of a contact information provides detail information about the corresponding business or individual. 'Download Statistics' of a contact information is a measure of the number of communication devices on which said contact information has been downloaded. 'Usage statistics' of a contact information is a measure of popularity and shows number of times said contact information has been retrieved by callers from contact list of communication devices. Preferably, 'Download Statistics' and 'Usage Statistics' also provides caller demographic information such as location, age, gender, etc. These measures provide advertisers means to find suitable businesses and individuals to pair an advertisement. An advertiser may pair advertisements with his or her contact information or may pair advertisement with contact information of other businesses and individuals, selected after due diligence. Preferably, advertisements are paired with contact information in a dynamic environment; wherein means is provided for businesses and individuals to pair an advertisement with different contact information at different times.

Figure 5:
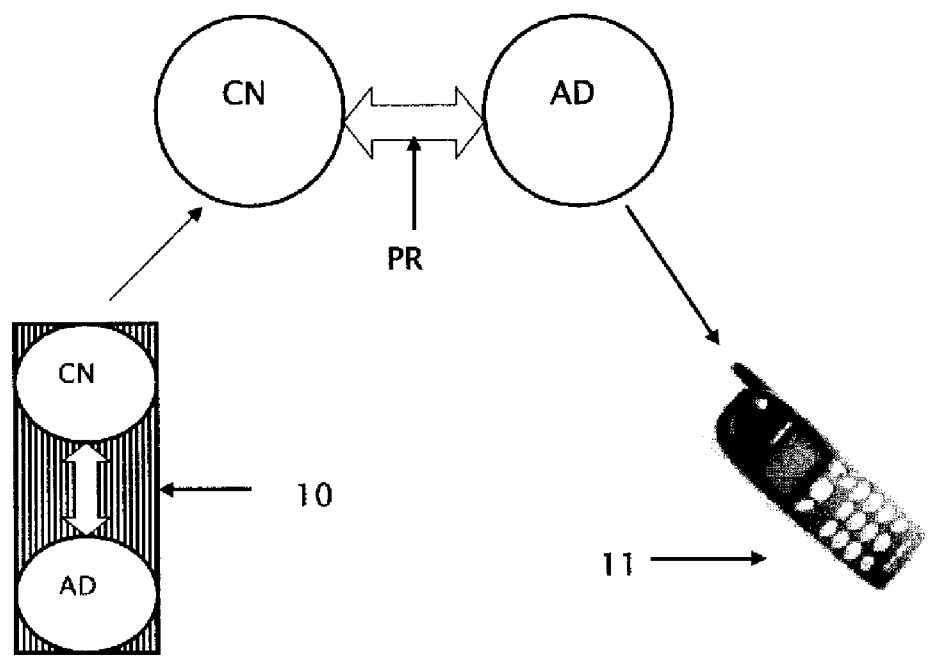
FIG. 5 shows the method of transfer of contact information and advertisement paired therewith from the 'central server' to communication device.

When contact information (CN) is transmitted from the 'central contact information database' in the 'central server' (10) to communication device (11), an advertisement (AD) paired (PR) with said contact information (CN) is also transmitted, as shown in FIG. 5. In the preferred method, means is provided in communication device to save advertisements in the contact list with corresponding contact information as shown in FIG. 3. An interface between the 'central contact information database' and the contact list of communication device is created which enables these two databases to communicate with each other. Means is provided to synchronize information contained in the contact list of communication device with the 'central contact information database' at regular intervals using principles shown in FIG. 3. This ensures that information contained in the contact list of communication device remains current. This enables making the process of pairing of advertisements with contact information in the 'central contact information' database dynamic, flexible and scalable. Advertisements contained in the 'central contact information database' can be changed or modified at any time. The said change or modification will accurately reflect in communication device once said communication device has synchronized with the 'central contact information database'. Means is provided in communication device to display advertisement, preferably at a time when corresponding contact information is displayed on communication device or when corresponding contact information is retrieved from contact list of said communication device by caller.

Figure 6A:
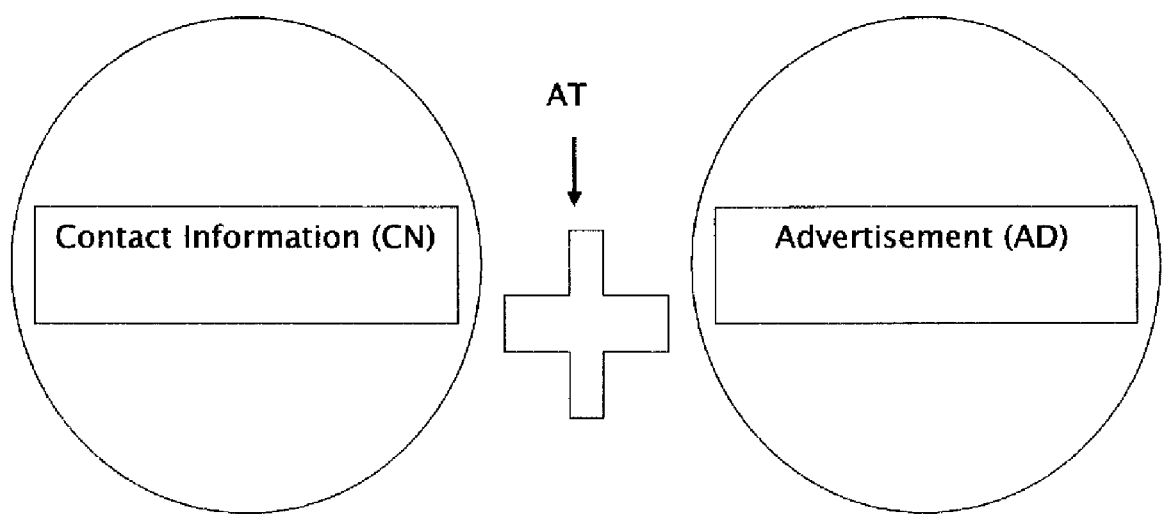
FIG. 6A illustrates the method of pairing of advertisement with contact information in the 'central contact information' database; wherein the advertisement and corresponding contact information are attached together.
Figure 6B:
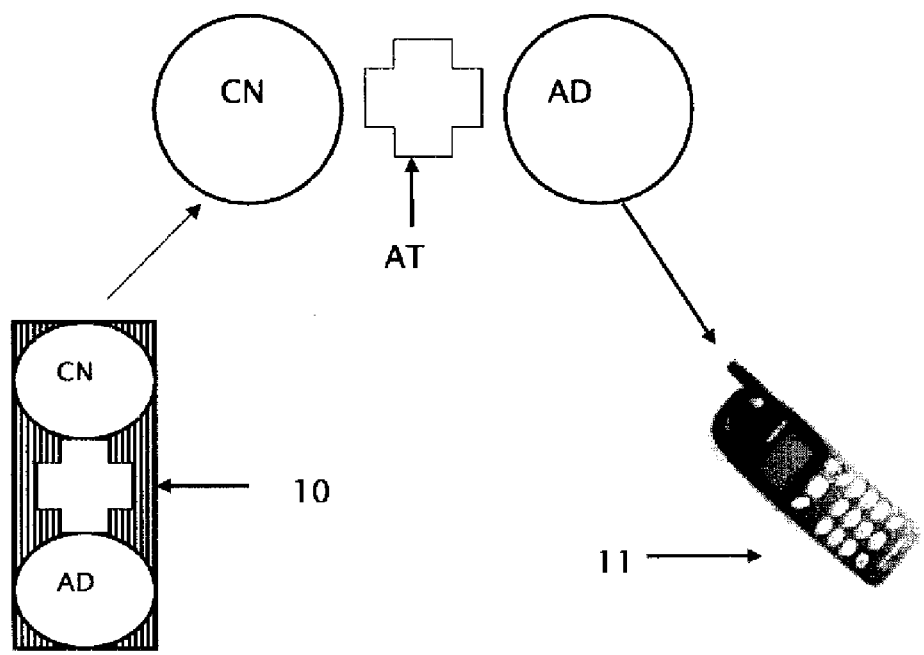
FIG. 6B shows the method of transfer of contact information and advertisement attached therewith from the 'central server' to communication device.
Figure 7A:
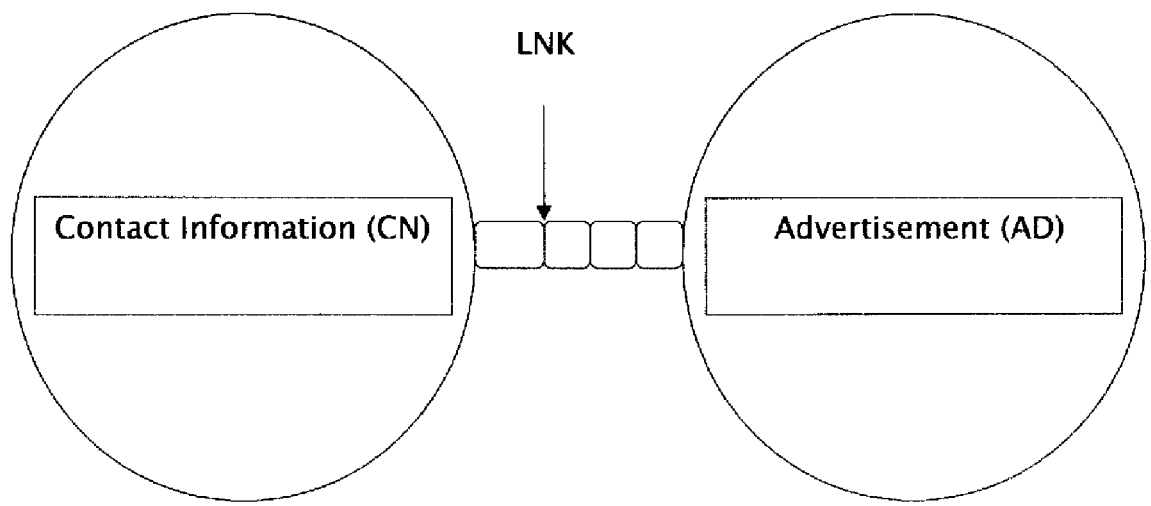
FIG. 7A illustrates pairing of advertisement with contact information in the 'central contact information' database by means of a 'link'.
Figure 7B:
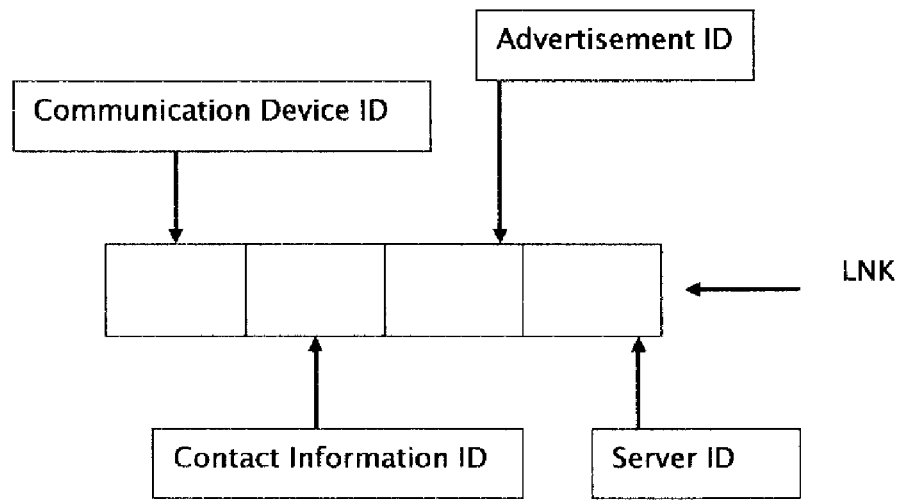
FIG. 7B shows the components of the 'link' that pairs advertisement with contact information in the 'central contact information' database.
Figure 7C:
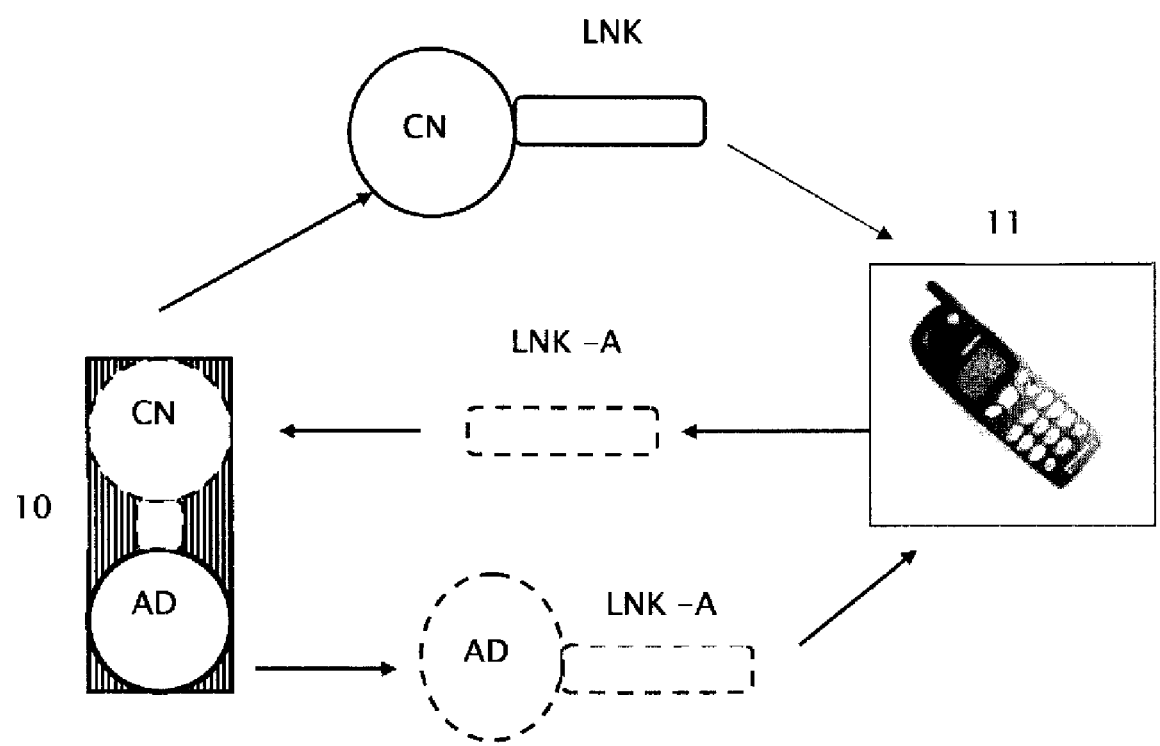
FIG. 7C shows the method of transfer of contact information and advertisement paired therewith from the 'central server' to communication device when said pairing is done by means of a 'link'.

Advertisements and contact information can be paired in the 'central contact information database' in two ways. According to one method shown in FIG. 6A, advertisement (AD) is attached (AT) to corresponding contact information (CN) in the 'central contact information database'. When contact information (CN) is transmitted from 'central server' (10) to communication device (11), corresponding advertisement (AD) attached there to is transmitted as well, as shown in FIG. 6B. In this method, advertisement is saved along side corresponding contact information in the contact list of communication device. Consequently, large memory capacity is required in communication device in order to save large number of contact information and corresponding advertisements. According to another method, advertisements (AD) are saved in the 'central server' (10) separate from contact information in the 'central contact information database'. Alternatively, advertisements can be saved in a separate server altogether. Contact information (CN) in the 'central contact information database' is paired with corresponding advertisement (AD) by means of a 'link (LNK)', as shown in FIG. 7A. FIG. 7B shows details of the 'link (LNK)'. The 'link (LNK)' is attached to corresponding contact information and comprises: 1) ID of the advertisement that it is linked to; 2) ID of the server where advertisement corresponding to said link is saved; 3) ID of contact information to which said link is attached; and 4) ID of communication device where said 'link' is saved upon transmission of corresponding contact information. As shown in FIG. 7C, when contact information (CN) is transmitted from 'central contact information database' in 'central server' (10) to communication device (11), the 'link' (LNK) attached to said contact information (CN) is transmitted as well. Means is provided in communication device (11) to save both contact information (CN) and the 'link' (LNK) attached there to. Once the 'link' (LNK) is in communication device (11), means is provided to incorporate ID of said communication device into the 'link' (LNK). The 'link' (LNK) in communication device is activated (LNK-A) when corresponding contact information is displayed on said communication device or when caller retrieves corresponding contact information from the contact list of said communication device. Active 'link' (LNK-A) is transmitted back to the 'central server' (10) where corresponding advertisement (AD) is saved. Server ID contained in the 'link' (LNK) guides the active 'link' (LNK-A) to the 'central server' (10). Once in the 'central server' (10), advertisement ID contained in the active 'link' (LNK-A) is used to retrieve advertisement (AD) corresponding to the active 'link' (LNK-A) from the 'central server' (10) following which advertisement (AD) and active 'link' (LNK-A) is transmitted back to the communication device (11) where the active 'link' (LNK-A) originated. Communication device ID contained in the active 'link' (LNK-A) is used to direct the advertisement (AD) and the active link (LNK-A) to the communication device (11) where the active 'link' (LNK-A) originated. Once in the communication device (11), contact information ID contained in the active 'link' (LNK-A) guides the active 'link' (LNK-A) and advertisement (AD) attached there-with to corresponding contact information (CN) saved in said communication device (11). Means is provided in communication device (11) to display advertisement (AD) brought in with the active 'link' (LNK-A) from the 'central server' (10). Although this method can work without saving advertisement in communication device, preferably means is provided in communication device to save advertisement brought in by the active 'link' from the 'central server'. According to this method, only advertisements corresponding to contact information retrieved from the contact list by a caller would need to be saved in communication device (and not all advertisements corresponding to all contact information saved in contact list of communication device), thus obviating need for large memory capacity in the communication device. This method also enables faster synchronization of contact information and advertisements between communication device and the 'central contact information database'. In this method synchronization of only 'links' (and not advertisements) corresponding to saved contact information is required, and is hence faster. In both the above methods, means is provided in the communication device to display advertisement, preferably when corresponding contact information is displayed on communication device and when corresponding contact information is retrieved from the contact list of communication device by caller.

Figure 8:
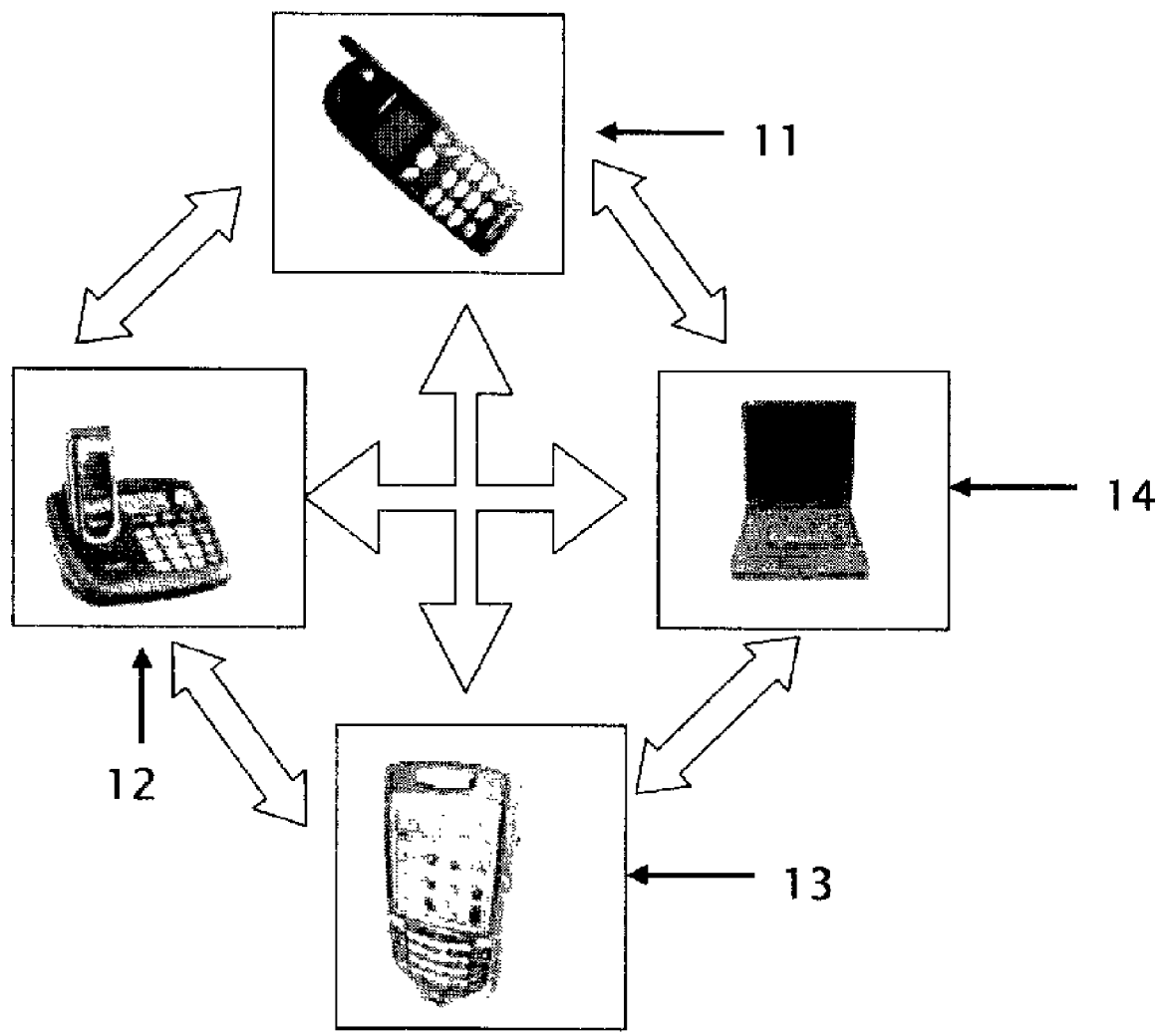
FIG. 8 illustrates the method of transfer of contact information data and advertisements paired therewith from first communication device to second communication device.
Figure 9:
FIG. 9 illustrates the similarity of database structure of the contact list of first and second communication devices and also shows the method of transfer of data contained in one data field of the contact list of first communication device to the corresponding data field of the contact list of second communication device.
Figure 9:
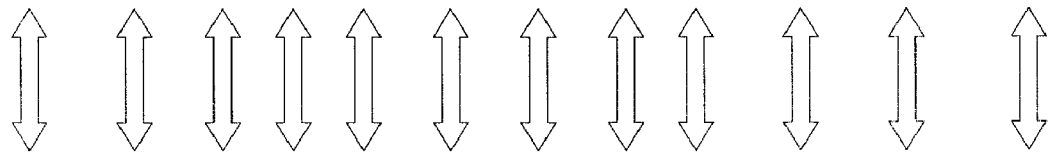
Figure 9:
Figure 10:
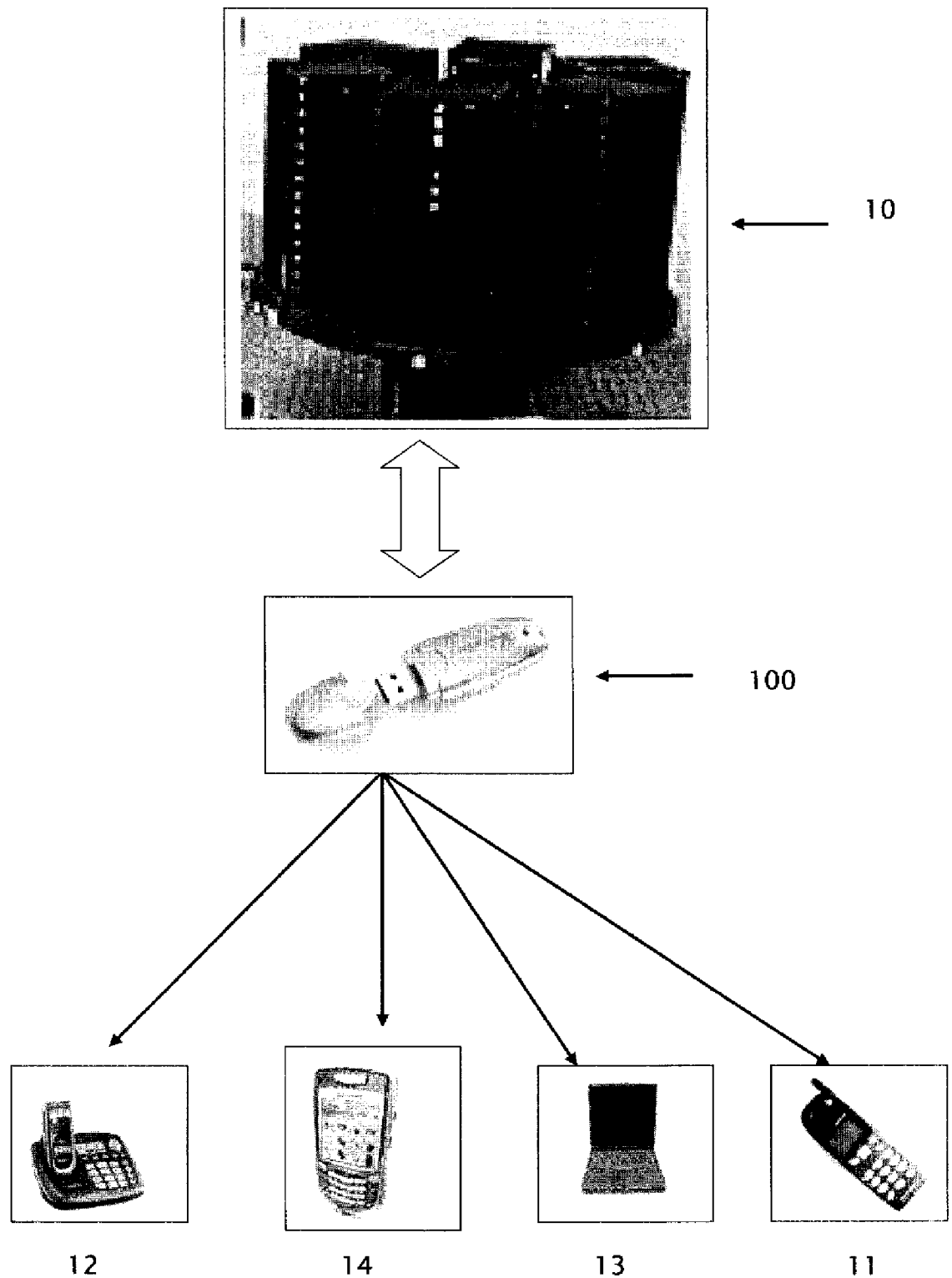
FIG. 10 shows a method of transfer of contact information data and advertisements from first communication device to second communication device wherein contact information data and corresponding advertisements is first downloaded from the 'central contact information' database into an external removable memory device, such as USB drive. Contact information data and corresponding advertisements can then be transferred from the external removable memory device to one or more communication devices.

According to another aspect of the invention, means is provided to transmit contact information and advertisement paired therewith from one communication device to another as shown in FIGS. 8 & 9. In this method, the database structure of contact list of various communication devices is uniform; wherein data fields in contact list of first communication device is similar to data fields in contact list of second communication device, as shown in FIG. 9. Communication devices communicate with each other over wired network or wireless network. Means is provided for caller to transmit information contained in the contact list of first communication device to the contact list of second communication device. According to another method shown in FIG. 10, information contained in the 'central server' (10) is downloaded into an external memory device (100) such as CD-ROM, floppy disk, USB drive, etc. The external memory device (100) is configured to save contact information and corresponding advertisement (or link). Means is provided in communication device (11-14) to accept external memory device (100) and extract information contained therein. Means is provided in communication device (11-14) to save contact information and advertisement (or link) extracted from external memory device (100) into its contact list using principles illustrated in FIG. 9.

The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. Some variations of the present inventions are: 1) in discussion of the present invention, contact information of local businesses is illustrated in many instances. However, this should not be considered limiting as contact information of businesses in any geographic area or contact information of other entities and individuals can be used similarly. 2) Cellular phone has been discussed in many instances as communication device, but the principles of present invention can be applied to other communication devices such as landline phone, fax machines, pager, personal computer, personal digital assistant (PDA), blackberry devices and the like. This list is by no means exhaustive. It is important, therefore, that the claims be regarded as including such equivalent constructions insofar as they do not depart from the spirit and scope of the present invention.

What is claimed is:

1. A method of generating contact information and associated advertisements of entities in a particular geographic area, the method comprising:
   providing a first centralized database having data fields for input of contact information, the first centralized database containing contact information of entities from multiple geographic areas;
   providing a second centralized database having data fields for input of advertisements which are associated with the contact information of one or more entities included in the first centralized database, wherein the contact information in the first centralized database has one or more advertisement links attached thereto and said advertisement link(s) is/are responsive to one or more corresponding advertisements in the second centralized database;
   providing a third database on a communication device having similar or substantially identical data fields as the first and second databases;
   capturing contact information and the associated advertisement link(s) from the first centralized database for one or more entities associated with the geographical location of the communication device;
   receiving an input selecting a contact contained in communication device;
   capturing advertisement responsive to link attached to select contact information from second database by means of communication link; and
   displaying the contact information and the advertisement on the communication device for the selected contact.

2. The method of claim 1 wherein each advertisement link comprises of a second database ID and corresponding advertisement ID.

3. The method of claim 1 wherein each advertisement link comprises of a corresponding communication device ID and corresponding advertisement ID.

4. The method of claim 1 wherein means is provided to retrieve the advertisement corresponding to the advertisement link from the second centralized database; and to transmit the advertisement to the communication device.

* * * * *